United States Patent [19]

Jacob et al.

[11] 4,119,704

[45] Oct. 10, 1978

[54] PROCESS FOR MAKING GALLIUM ARSENIDE OR PHOSPHIDE

[75] Inventors: Herbert Jacob, Burghausen; Michael Blatte, Emmerting; Fritz Kremser, Burghausen, all of Fed. Rep. of Germany

[73] Assignee: Wacker-Chemitronic Gesellschaft fur Elektronik-Grundstoffe mbH, Burghausen, Fed. Rep. of Germany

[21] Appl. No.: 827,059

[22] Filed: Aug. 28, 1977

Related U.S. Application Data

[63] Continuation of Ser. No. 652,261, Jan. 26, 1976, abandoned.

[30] Foreign Application Priority Data

Feb. 14, 1975 [DE] Fed. Rep. of Germany ....... 2506265

[51] Int. Cl.$^2$ .................... C01B 25/00; C22C 28/00; C22C 30/00
[52] U.S. Cl. ................................. 423/299; 75/134 T
[58] Field of Search ....................... 423/299; 75/134 T

[56] References Cited

FOREIGN PATENT DOCUMENTS 276,112 8/1877 United Kingdom .................... 423/299
949,945 9/1960 United Kingdom .................... 423/299

OTHER PUBLICATIONS

The Condensed Chemical Dictionary, 1962, p. 525.

Primary Examiner—O. R. Vertiz
Assistant Examiner—Gregory A. Heller
Attorney, Agent, or Firm—Allison C. Collard; Thomas M. Galgano

[57] ABSTRACT

A process for producing gallium arsenide or phosphide at temperatures below the sublimation point of arsenic and red phosphorus, respectively, which consists of grinding and tempering a mixture of the constituent elements of the compound to be obtained in substantially stoichiometric amounts.

7 Claims, No Drawings

PROCESS FOR MAKING GALLIUM ARSENIDE OR PHOSPHIDE

This is a continuation of application Ser. No. 652,261 filed Jan. 26, 1976, now abandoned.

The invention relates to a process for making arsenides or phosphides of the elements of the main group III of the periodic system at temperatures below the sublimation point of arsenic or red phosphorus, respectively.

When a monocrystalline seed crystal is grown from $A^{III}B^{V}$ semi-conductor material, e.g., gallium arsenide or gallium phosphide, in accordance with the conventional crucible drawing process, the corresponding polycrystalline compound is required for use as a starting material. The generally known process for the preparation consists of the known synthesis from the elements by reaction of arsenic or phosphorus vapor, respectively, with gallium at 1,240° or 1,470° C in a closed, evacuated system made mostly of quartz, the process being carried out in a programmed multiple temperature oven.

Other methods of production in open systems, i.e., not sealed by melting or not evacuated, are, in comparison, without economic value. Thus, e.g., polycrystalline gallium arsenide or gallium phosphide can be produced by reduction of volatile gallium, and arsenic or phosphorus compounds with hydrogen (German Pat. No. 1,132,098); by introducing gaseous arsenic or phosphorus trichloride into liquid gallium (German Offenlegungsschrift No. 1,544,265); by passing arsenic or phosphorus vapor over gallium (Deutsche Auslegeschrift No. 1,265,716); from gallium-organic compounds and arsenic compounds with hydrogen (German Auslegeschrift No. 1,281,404); by reduction of a volatile gallium compound with hydrogen in the presence of arsenic vapor (German Offenlegungsschrift No. 1,444,508); by passing gallium droplets through arsenic vapor (German Auslegeschrift No. 1,175,206); by thermal decomposition of gallium alkyls and arsenic alkyls (German Auslegeschrift No. 1,667,268); by decomposition of gallium alkyl in the presence of arsenic vapor and phosphorus vapor, respectively (German Auslegeschrift No. 1,130,421); by passing arsenic trichloride or phosphorus trichloride over gallium (German Auslegeschrift No. 1,096,886); or by thermal decomposition of respective hydride complexes (German Auslegeschrift No. 1,042,539).

It is an object of the present invention to provide an economic process of synthesis of polycrystalline gallium arsenide or phosphide as semiconductor material composed of approximately stoichiometric amounts starting from the elements which permit quantities up to kilograms of material to be obtained while working in open reaction vessels, that is to say, vessels which are neither sealed by melting nor evacuated.

A process has now been found according to the invention for producing gallium arsenide and phosphide at temperatures below the sublimation points of arsenic and red phosphorus, respectively, which consists of grinding and tempering a mixture of the elements forming the compound desired in substantially stoichiometric amounts. It must be considered as very unexpected that it is possible to obtain, e.g., gallium arsenide by direct synthesis of the elements at temperatures far below 800° C, since the experts in this field assumed that such a synthesis could not be achieved. (See "Gmelins Textbook of Inorganic Chemistry" German title: Gmelins Handbuch der Anorganischen Chemie, 8th edition, Volumn "Gallium" p. 95.)

The process can be carried out in a one-step operation by simultaneous grinding and tempering, or in a multi-step process by repeated, subsequent grinding and tempering in separate operations. To carry out the one-step process, heatable grinding apparatus are suitable, which grind or triturate mixtures of gallium and arsenic or phosphorus at temperatures slightly below the sublimation point of the second component; and preferably 5° to 50° C below the temperature is maintained at the start, such as during the first 15 – 45 minutes after charging the apparatus, about 200° to 400° C below the sublimation point of the last mentioned component.

In the preferred multi-step process, which makes it possible to grind at room temperature and is consequently simpler as far as the equipment is concerned, the starting materials are first thoroughly mixed in a grinding and mixing device, e.g., in a mortar of china or better boron carbide, the amount of the second component preferably being small, up to about 10% excess. The mixing is effected advantageously in a mechanically operated device. The several grinding steps are best performed under an inert gas, e.g., nitrogen, argon, or hydrogen, either separately or in mixture, the use of an inert gas glove box being recommended.

In the preferred multi-step system of preparing arsenic-gallium or phosphorus-gallium, the first grinding operation leads to a mixture of paste-like consistency, when in the conventional manner, grinding takes place above 30° C, mostly between 30° and 60° C. Subsequently, the mass is tempered at comparatively low temperature, about 200° – 400° C below the sublimation point of the arsenic or phosphorus component. The tempering time is, as in the following steps, preferably 15 – 45 minutes.

In the second and every subsequent grinding step, the product, which has assumed grainy consistency, is very finely ground, the aim being to obtain a mean particle size below 2 μ. The tempering steps interposed between grinding steps are carried out preferably slightly below, about 5° – 50° C below the sublimation temperature of arsenic or red phosphorus, respectively.

Moreover, it was found to be advantageous to have, during the tempering step, an atmosphere of inert gas or hydrogen present above the mixture, in order to avoid oxide formations.

Depending on the tempering time in each case and on the grain size of the intermediate products after the several grinding steps, the multi-step process results after about 3 to 8 grinding and tempering steps following each other, in a reaction product containing about 80 to 90% by weight of the gallium arsenide or phosphide, from which the excess of the second component if necessary, can be easily removed by sublimation.

In principle, it is also possible to produce the desired gallium arsenide or phosphide compounds by grinding and tempering above the sublimation temperature of arsenic and phosphorus, but below the decomposition temperature of the compounds to be synthesized, thus below 800° C. In that case, however, the arsenic escaping by sublimation, has to be added continuously to the reaction mixture in an appropriate manner. It should, however, be considered that the advantage of the shorter reaction time due to the higher temperature is counterbalanced by the disadvantage of the costs of more expensive equipment.

The reaction product obtained can be used as starting material for crystal growing, for instance, in the crucible drawing process according to Gremmelmeier or according to the LEC method or as a source material in the gaseous phase or liquid epitaxy.

Compared to the extensively used conventional synthesis processes, the process according to the invention, particularly in its preferred embodiment, has the advantage that it can be carried out in simple quartz, china, or glass vessels, without sealing by melting down; furthermore, no impurities can be formed, as they are found by reaction of gallium melts with the wall of the vessel.

In the following, the process of the invention will be more fully described in two specific examples, but it should be understood that this is given only by way of illustration and not of limitation.

EXAMPLE I 154 g arsenic were ground with 143.3 g gallium to the consistency of a thick paste in a mortar of boron carbide heated to about 50° C, and placed in a glove box charged with argon; and subsequently tempered in a quartz tube at 400° C under an atmosphere of hydrogen. The obtained reaction product consisted of 49.6% by weight of gallium arsenide and could easily be ground to a fine powder in the mortar. This powder was subsequently tempered for 30 minutes in a hydrogen atmosphere at 600° C, which caused small quantities of arsenic to sublimate; these were collected and returned to the goods undergoing grinding. The analysis that followed already showed a gallium arsenide content of 65.1% by weight. Two subsequent steps of grinding and tempering led to 255 g of an end product with 89.3% by weight of gallium arsenide. An excess of arsenic was sublimated at 650° C and the reaction product was thereafter converted into monocrystalline gallium arsenide according to the LEC method.

EXAMPLE II 70 g of red phosphorus and 140 g gallium were charged into a ball mill of boron carbide having a capacity of 5 liters, 1.5 liters which were filled with boron carbide balls having diameters from 15 – 40 mm. After air had been displaced with argon, the substances in the mill were ground at 70 rpm, and the contents of the mill were heated up to 400° C in the course of about 25 minutes. Grinding was continued for another 60 minutes at that temperature, whereafter the mass was cooled down to room temperature (about 20° C). The reaction product obtained was a fine gray powder, which was identified positively as gallium phosphide by X-ray analysis. The powder was tabletted by compression and converted into monocrystalline gallium phosphide according to the LEC method.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for producing gallium arsenide or phosphide comprising the steps of:
   (a) forming an intimate mixture of liquid metallic gallium and either arsenic or red phosphorus, in substantially stoichiometric proportions;
   (b) grinding said mixture at a temperature between 30° C and about 60° C to attain a pasty consistency for a period of time to induce formation of gallium arsenide or phosphide;
   (c) tempering the ground mixture by heating at a temperature between about 200° C and about 400° C below the sublimation point of the arsenic or the red phosphorus; and
   (d) recovering the gallium arsenide or phosphide.

2. The process according to claim 1 wherein the grinding and tempering is effected in repeated, subsequent, separate steps.

3. The process according to claim 2 wherein the subsequent tempering steps occur about 5° C to 50° C below the sublimation points of arsenic and red phosphorus, respectively.

4. The process according to claim 1 wherein 3 to 8 grinding and tempering steps follow each other.

5. The process according to claim 4 wherein each tempering step is carried out for 15 – 45 minutes.

6. The process according to claim 2 wherein in the second and each subsequent grinding step, the product is ground to an average particle size of less than 2 $\mu$.

7. The process of claim 1 in which the grinding step is performed under a blanket of an inert gas.

* * * * *